(No Model.)

O. F. BALSTON.
BOLT HEAD.

No. 400,161. Patented Mar. 26, 1889.

Witnesses:
A. Bryson Jr
Jos. Strachan

Inventor.
Oscar F. Balston

UNITED STATES PATENT OFFICE.

OSCAR F. BALSTON, OF BROOKLYN, NEW YORK.

BOLT-HEAD.

SPECIFICATION forming part of Letters Patent No. 400,161, dated March 26, 1889.

Application filed August 17, 1888. Serial No. 283,043. (No model.)

*To all whom it may concern:*

Be it known that I, OSCAR F. BALSTON, of Brooklyn, county of Kings, and State of New York, have invented an Improvement in Bolt-Heads, of which the following is a full, clear, and exact description.

My invention relates to an improvement in bolt-heads to obviate the necessity of counter-sinking the bolt-head and filling the cavity with cement, mastic, or other ingredients to keep out water in guard-rails, ties, stringers, &c., of elevated railroads, bridges, docks, and other structures where timber is exposed to the weather.

Reference is to be had to the accompanying drawings, forming a part of this specification, in which similar letters of reference indicate corresponding parts in all the figures.

Figure 1:
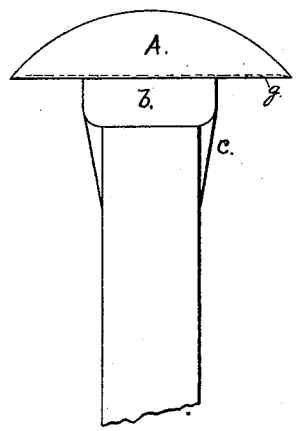
Figure 2:
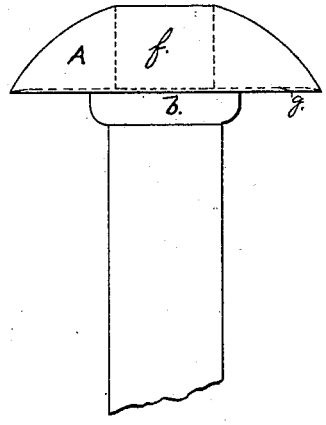
Figure 3:
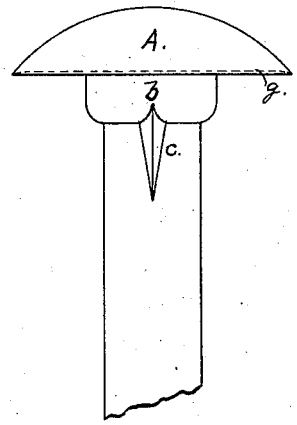
Figure 4:
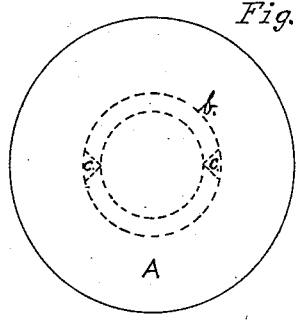
Figure 5:
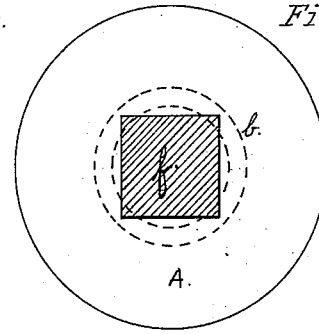
Figure 6:
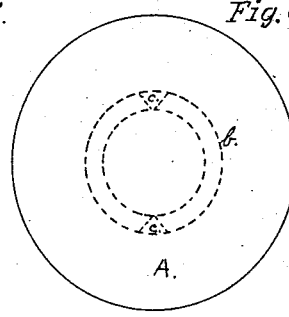
Figure 7:
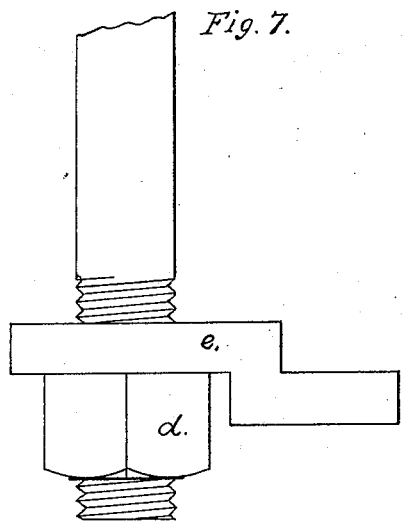
Figure 8:
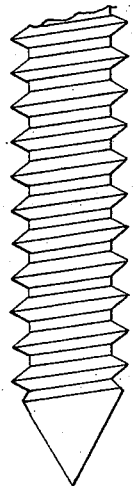
Figure 9:

Figure 1 is an elevation of my improved screw-bolt head. Fig. 2 is an elevation of my improved lag-screw-bolt head. Fig. 3 is an elevation of my improved drift-bolt head. Fig. 4 is a top view or plan of Fig. 1. Fig. 5 is a top view or plan of Fig. 2. Fig. 6 is a top view or plan of Fig. 3. Fig. 7 is an elevation of the end of bolt of Fig. 1. Fig. 8 is an elevation of the end of lag-screw bolt of Fig. 2, and Fig. 9 is an elevation of the end of drift-bolt, Fig. 3.

Under the head of the bolt A, Fig. 1, the body of the bolt is made larger in diameter, as shown at $b$, so that when the bolt is driven into the wood the part $b$ will compress the fibers of the timber and form a water-tight joint, allowing no water to follow down the bolt-hole, (which is usually made one-sixteenth of an inch larger in diameter than the bolt,) and as the timber shrinks the compressed fibers will expand and keep the joint tight. A lip or wedge, $c$, Figs. 1 and 4, is formed on each side of the bolt near the head, which prevents the bolt turning when the nut $d$ is screwed on with a wrench. Fig. 1 can also be used as a clip or hook-bolt, when part $e$ is attached, to fasten ties to wrought-iron flanges of girders. The head of the bolt A, Figs. 1, 2, and 3, is made slightly concave, $g$, so that the outer rim will set down close on the timber to prevent water running under the head. Fig. 2 shows my improved lag-screw-bolt head having the same swell $b$ under the head A and concave $g$. A square hole, $f$, Figs. 2 and 5, is made in the head of the bolt A, sufficiently large to insert a wrench to set the bolt down in the timber. Fig. 3 is the same as Fig. 1, with the end, Fig. 9, pointed.

Having thus described my invention, what I claim as new, and desire to secure by Letters Patent, is—

The bolt-head A, having on its under side a part, $b$, being of a diameter between the diameters of the bolt-head A and the bolt proper, having one or more lips, $c$, running from the swelling $b$ to the bolt proper, as shown in Figs. 1, 3, 4, and 6, all as described above, and for the purpose set forth.

OSCAR F. BALSTON.

Witnesses:
   ANDREW BRYSON,
   JOSEPH STRACHAN,
   JAMES B. KEYES.